United States Patent [19]

Schaepman

[11] 3,803,390

[45] Apr. 9, 1974

[54] METHOD AND APPARATUS FOR THE DIGITAL DETECTION OF PREDETERMINED FREQUENCIES

[75] Inventor: Ellert A. F. M. Schaepman, Zurich, Switzerland

[73] Assignee: Hasler AG, Bern, Switzerland

[22] Filed: Apr. 19, 1972

[21] Appl. No.: 245,493

[30] Foreign Application Priority Data
Apr. 22, 1971  Switzerland.......................... 5616/71

[52] U.S. Cl. .............................. 235/152, 324/77 B
[51] Int. Cl. ............................................ G06f 7/38
[58] Field of Search.................. 235/156, 164, 152; 328/167; 324/77 B

[56] References Cited
UNITED STATES PATENTS
3,619,586  11/1971  Hoff, Jr................................ 235/156
3,633,170  1/1972  Jones, Jr.......................... 340/172.5
3,683,162  8/1972  Jacob................................. 235/156

Primary Examiner—Felix D. Gruber
Assistant Examiner—David H. Malzahn
Attorney, Agent, or Firm—Rupert J. Brady et al.

[57] ABSTRACT

A process and apparatus are provided whereby a signal containing mixed frequencies is sampled in equal time intervals T which are smaller than the half cycle of the highest frequency contained in the mixture of frequencies, obtaining a value from each sampling operation, wherein this value, considered as a real magnitude is added to a complex value calculated from the preceding sampling operations; the resulting complex value is multiplied by a constant complex value $e^{j \Omega T}$, in which $\Omega$ is the predetermined frequency. The product obtained as a result of the multiplication is delayed by the time T to form the named calculated complex value to be added to the next sampled result, and the product is checked successively as to whether one of its components exceeds a predetermined threshold value, which fact gives an indication of the presence of the desired frequency in the mixed frequency signal.

1 Claim, 7 Drawing Figures

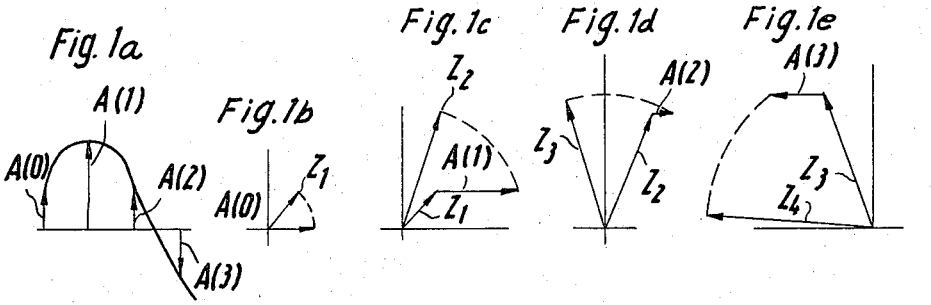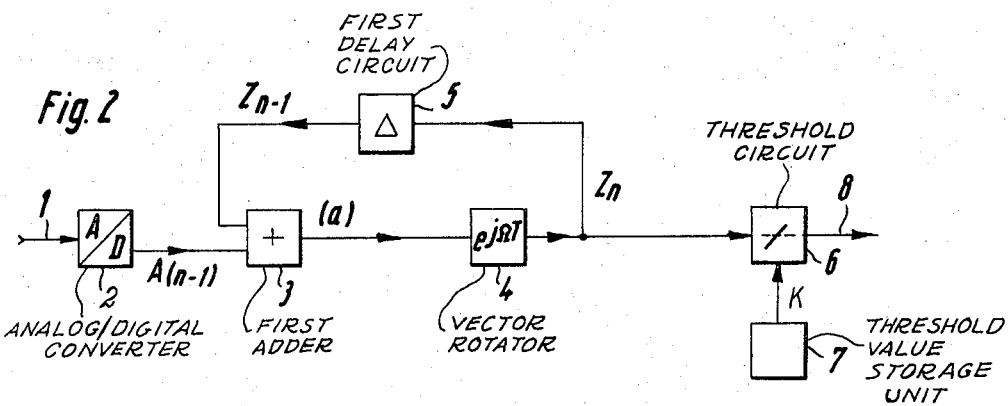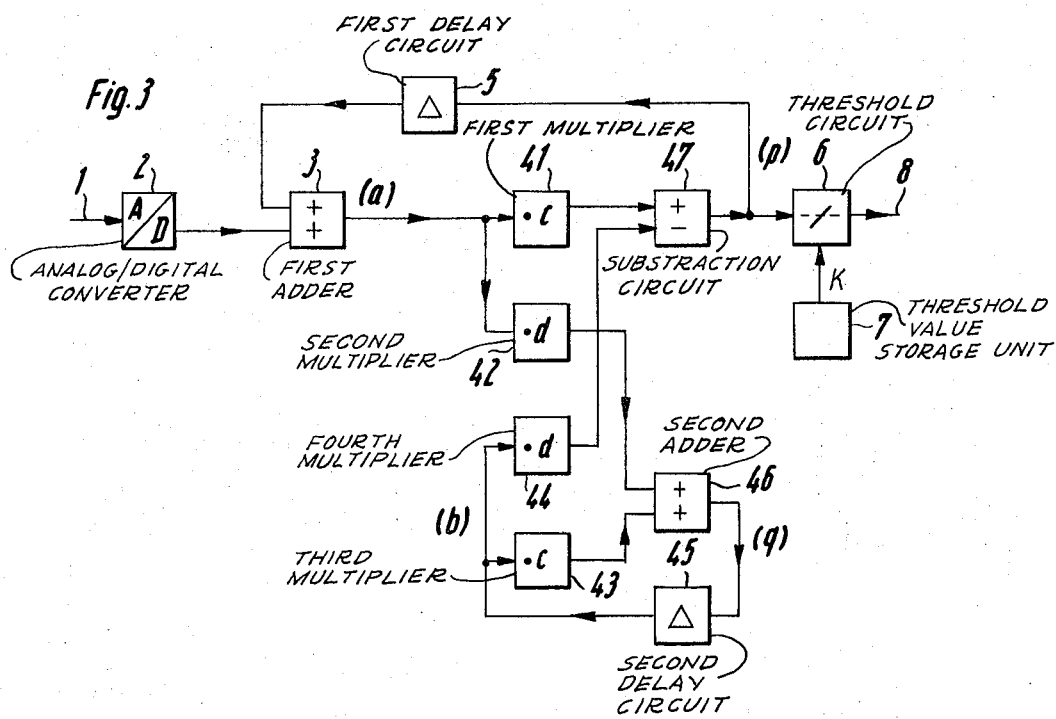

METHOD AND APPARATUS FOR THE DIGITAL DETECTION OF PREDETERMINED FREQUENCIES

The invention concerns a process and apparatus for the recognition of a predetermined frequency in a mixture of frequencies.

The use of mechanical or electric resonance apparatus for this purpose is known. However these apparatus have the disadvantage that they take up a lot of space especially when dealing with low frequencies, that they have to be tuned and that this state of tuning may change in the course of time.

The present invention shows a way by means of which the problem at hand may be resolved without the use of analog resonance structures, It is so characterized that the signal containing the mixed frequencies is sampled in equal time intervals T which are smaller than the half cycle of the highest frequency contained in the mixture of frequencies, that each value obtained by a sampling operation is added to a complex value calculated from the preceding sampling operations, that the complex sum such obtained is multiplied with a constant complex value $e^{j\Omega T}$, in which $\Omega$ is the predetermined frequency, that the product obtained as a result of the multiplication delayed by the time T forms the named calculated complex value to be added to the next sampling result, and that the product is checked successively as to whether one of its components exceeds a predetermined threshold value, which fact gives an indication of the presence of the frequency $\Omega$ in the mixture of frequencies.

Execution of the calculating operations may be effected directly with the amplitude-modulated impulses obtained through sampling in the same way. However, more advantageously, each sampling result is converted into a digital value and the addition, subtraction and multiplication as well as the delaying and the comparison with the threshold value are effected as arithmetical operations with the digital values obtained.

The equipment for carrying out the process comprises an analog/digital converter for sampling the frequency mixture and for the conversion of each sampling result into a value expressed by a digital code word of more than one digit, a first adder, the inputs of which are connected with the output of the analog/digital converter and with the output of a first delay circuit respectively, a first multiplier which is connected to the output of the first adder for multiplication of the value obtained from this adder with a first constant, a second multiplier which is also connected with the output of the first adder for multiplication of the value obtained from this adder with a second constant, a third multiplier, the input of which is connected with the output of a second delay circuit, for multiplication of the value obtained from this delay circuit with the first constant, a fourth multiplier, the input of which is also connected with the output of the second delay circuit, for multiplication of the value obtained from this delay circuit with the second constant, a subtraction circuit, the positive input of which is connected with the output of the first multiplier and the negative input of which is connected with the output of the fourth multiplier and the output of which is connected with a threshold circuit and, with the input of a first delay circuit, a second adder, the first input of which is connected with the output of the second multiplier and the second input of which is connected with the output of the third multiplier and the output of which is connected with the input of the second delay circuit.

The described digital frequency detecting filter has the advantage that it may be set up using integrated circuits without the use of oscillation circuits. The frequency sought can be set with optional precision in relation to the sampling frequency by giving the digital values a number of digits determined by the degree of precision required. Even with a considerable change in the properties of the circuit elements the frequency does not change, so long as the changes are not so great as to interfere with the digital operation of the equipment search frequencies. For the detection of more than any one frequency, which may stand in relation to one another, only one sampling frequency is required. This is especially advantageous in two cases:

1. In so far as a very precise pulse frequency is present, as for example in PCM systems
2. If the search frequencies have to be produced from a master oscillator through complicated frequency dividers.

The sampling frequency must be higher than double the highest search frequency.

The frequency-detecting process and the setting up and operating method of a digital frequency-detecting filter are explained by way of example with reference to the accompanying drawings, in which:

FIG. 1a shows a section from the function examined;

FIGS. 1b to 1e show vector diagrams to explain the search procedure;

FIG. 2 shows a simple block diagram of an embodiment of a frequency-detecting filter; and FIG. 3 shows a complete illustration of the frequency-detecting filter of FIG. 2.

In FIG. 1a A is a section of a curved path which represents a function of a signal, e.g., of an electric voltage, as function of time. This function is sampled at equal intervals T, whereby at time $t = 0$ the sampling value A (0) is obtained, at time $t = T$ the sampling value A(1) is obtained, and so on.

FIGS. 1b to 1e give circle diagrams of the complex magnitudes $Z_1$ to $Z_4$, of which each magnitude $Z_n$ is obtained in accordance with the process to be described from the preceding magnitude $Z_{n-1}$. In FIG. 1b A(0) is the first sampling value plotted horizontally. This is multiplied with $e^{j\Omega T}$, i.e., rotated through the angle $\Omega T$ and gives the complex vector $Z_1$. $\Omega$ is, as already stated, the search frequency, i.e., the frequency the presence of which is to be established, and T the time between two sampling operations. The sampling value A(1) is added to $Z_1$ and the combined vector is again rotated through the angle $\Omega T$, which gives the vector $Z_2$. In a corresponding manner the vectors $Z_3$ and $Z_4$ are obtained.

Thus $$Z_N = [Z_{n-1} + A(n-1)]e^{j\Omega T}; \quad Z_0 = 0$$

$$Z_N = \sum_{n=0}^{N-1} A(n)e^{j(N-n)\Omega T} \quad n = 1, 2, 3 \ldots$$

It is presumed that the signal A(t) can be represented as the sum of sine oscillations with circuit frequencies $\omega_1, \omega_2, \omega_3, \ldots$:

$$A(t) = \sum_{k=-\infty}^{+\infty} C_k e^{j\omega_k T} \quad \text{with } |\omega_k| < \frac{\pi}{T}$$

If this expression is inserted for $A(n)$, we obtain:

$$Z_N = \sum_{n=0}^{N-1} \left( \sum_{k=-\infty}^{K+\infty} C_k \cdot e^{j\omega_k nT} \right) e^{j(N-n)\Omega T}$$

and after rearrangement:

$$Z_N = e^{Nj\Omega T} \sum_{k=-\infty}^{+\infty} C_k \sum_{n=0}^{N-1} e^{jnT(\omega_k - \Omega)}$$

For evaluating the sum $$\sum_{n=0}^{N-1} e^{jnT(\omega_k - \Omega)}$$

two cases must be distinguished: either a frequency $\omega_i$ is contained in the examined function $A$, then $$\sum_{n=0}^{N-1} e^{jnT(\omega_i - \Omega)} = \sum_{n=0}^{N-1} e^{jnT \cdot 0} = \sum_{n=0}^{N-1} 1 = N$$

Thus the sum tends towards $\infty$ as $N$ increases. If the frequency $\Omega$ is not contained in the examined function we calculate the sum by putting $$\sum_{n=0}^{N-1} e^{jnT(\omega_i - \Omega)} = \sum_{n=0}^{N-1} q^n$$

where $$q = e^{jT(\omega_i - \Omega)}$$

The sampling frequency $\omega_T/2\pi$ is such that $$|\omega_i| < \omega_T/2 \text{ and } |\Omega| < \omega_T/2$$

therefore $$0 < |\omega_i - \Omega| < \omega_T$$

and $$0 < T \cdot |\omega_i - \Omega| < T \cdot \omega_T = 2\pi$$

whence 8  1
Therefore the members of the sum form a geometrical series with o  1
and we have $$\sum_{n=0}^{N-1} e^{jnT(\omega_i - \Omega)} = \sum_{n=0}^{N-1} q^n = 1 + q + q^2 + q^3 + \ldots + q^{N-1} = \frac{1 - q^N}{1 - q}.$$

Since $|q^N| = 1$ the magnitude of this expression is $$\leq 2/|1 - q|$$

for any $N$, i.e., it is limited.

Since the vector $Z$ is rotated through the angle $\Omega T$ at times, it is not necessary to measure its magnitude; the measurement of a component suffices, e.g., in the direction of the real axis. Then the amount of this component, from a certain point in time onwards, will be greater than the threshold value roughly twice per rotation.

The higher the threshold value is selected, the more selective the filter is, but also the longer it takes (with constant amplitude of the frequency to be detected in the time function) for the value to be exceeded.

FIG. 2 shows an arrangement for the realization of the described process. Reference numeral 1 represents the input of the frequency-detecting filter which receives the time function to be examined. 2 is an analog/digital converter which samples the voltage of the input 1 at intervals $T$ and converts the samples into digital values. At the output of the analog/digital converter the digital values may occur in parallel or series. They go to a first adder 3. The sum $a$ obtained in the adder is rotated through the constant angle $\Omega T$ in a vector rotator 4. The value $Z$ obtained is delayed by the time $T$ in the delay circuit 5 and added to the next sampling value A in the adder 3. A comparator or threshold circuit 6 compares the magnitude $Z$ with a threshold value $K$ which was selected after the given calculations and is retained in the threshold value storage unit 7. If $Z$ is greater than $K$, then the comparator circuit emits an output signal on line 8, which indicates that the frequency $\Omega$ is present in the frequency mixture examined.

In FIG. 3 the same circuit is repeated, but with a more detailed illustration of the vector rotator 4. This rotator comprises the multipliers 41 and 43, which multiply the value at their input by a constant $c$, multipliers 42 and 44, which multiply the value by a constant $d$ at their input, a second delay circuit 45, which delays the value at its input by the time $T$, an adder 46 and a subtraction circuit 47.

The value occurring at the output of the adder 3 is multiplied by the constant $c$ in the first multiplier 41 and by the second constant $d$ in a second multiplier 42. At the same time the value $b$ appearing at the output of the second delay circuit 45, which delays a digital value by $T$, is multiplied in the third multiplier 43 by the first constant $c$ and in the fourth multiplier by the second constant $d$. From this we obtain at the output of the first multiplier 41 the product $ac$, at the output of the second multiplier 42 the product $ad$, at the output of the third multiplier 43 the product $bc$ and at the output of the fourth amplifier 44 the product $bd$.

In the subtraction circuit 47, which is connected to the outputs of the first and fourth multipliers, the difference $p = ac - bd$ is formed. This amount is checked in the limiting value circuit 6 as to whether it exceeds the predetermined value $K$ or not.

The value $p$ continues to the input of the first delay circuit 5, in which it is delayed by $T$, in order to be fed to the second input of the adder 3.

The outputs of the second and third multipliers 42 and 43 are connected with both inputs of the second adder 46, to the output of which the second delay circuit is connected. If the constants $c, d$ are chosen such that $$e^{j\Omega T} = c + jd$$

then the circuit of FIG. 3 is the same as that of FIG. 2. If $$A(n-1) + Z_{n-1} = a + jb$$
$$Z_n = p + jg$$

then $Z_n = [Z_{n-1} + A(n-1)]e^{j\Omega T}$
$= (a + jb)(c + jd)$
$= ac - bd + j(ad + bc)$ This function is effected by the circuit of FIG. 3 if the values at the output of the second adder 46 are seen as imaginary values. As the values added in the adder 3 are real, it suffices to add them to real part of $Z_{n-1}$, i.e., to $p$, while the imaginary part $q$ remains unaltered and gives $b$, $a, b, p, q$ can take both positive and negative values.

As in conformity with the sampling theorem at least one sample must be made during each half cycle of the highest frequency contained in the frequency mixture, therefore also during each half cycle of the search frequency $\Omega$, $\Omega T$ must be $<\pi$, i.e., the angle of rotation in FIG. 1 is always smaller than 180°.

Obviously numerous possibilities are present for carrying out the process and modifying the described arrangement, especially through multiple utilization of parts of a circuit in the time multiple procedure.

Also the constants may be conveyed individually from a memory to the multipliers and the comparator circuits for each step in the calculation. If, moreover, the delay units 5 and 45 are replaced by $m$-step shift registers, which are switched on $m$ times during each sampling period, and if $m$ different value groups are stored in the memory, then $m$ different frequencies may be sought simultaneously. The results then appear in time multiplex at the output 8.

What I claim is:

1. Apparatus for the recognition of a predetermined frequency in an analog or digital time function comprising an analog/digital converter for sampling the time function frequency mixture and for conversion of each sampling result into a value expressed by a digital code word of more than one digit, a first delay circuit, a first adder, the inputs of the first adder are connected with the output of the analog/digital converter and with the output of the first delay circuit respectively, a first multiplier which is connected with the output of the first adder for the multiplication of the value obtained from the first adder with a first constant, a second multiplier which is also connected with the output of the first adder for the multiplication of the value obtained from the first adder with a second constant, a second delay circuit, a third multiplier, the input of the third multiplier is connected with the output of the second delay circuit, for multiplication of the value obtained from the second delay circuit with the first constant, a fourth multiplier, the input of which is also connected with the output of the second delay circuit, for multiplication of the value obtained from the second delay circuit with the second constant, a subtraction circuit, the positive input of which is connected with the output of the first multiplier and the negative input of which is connected with the output of the fourth multiplier, a threshold circuit, the output of the subtraction circuit is connected with the threshold circuit and with the input of the first delay circuit, a second adder, the first input of which is connected with the output of the second multiplier and the second input of which is connected with the output of the third multiplier and the output of which is connected with the input of the second delay circuit.

* * * * *